United States Patent [19]

Fulenwider

[11] 3,958,237

[45] May 18, 1976

[54] ACOUSTIC TO PULSE CODE TRANSDUCER

[75] Inventor: John E. Fulenwider, Concord, Mass.

[73] Assignee: GTE Laboratories Incorporated, Waltham, Mass.

[22] Filed: Mar. 31, 1975

[21] Appl. No.: 563,870

[52] U.S. Cl. .................... 340/347 AD; 340/347 P; 179/111 R; 179/15 A
[51] Int. Cl.² .................... H04R 23/00; H04J 3/06
[58] Field of Search ................. 340/347 P, 347 AD; 179/15 AL, 15 A, 15 AS, 111 R, 15 AT, 2 DP

[56] References Cited
UNITED STATES PATENTS

| | | | |
|---|---|---|---|
| 3,440,642 | 4/1969 | Levine | 340/347 P |
| 3,467,957 | 9/1969 | Levine | 340/347 P |
| 3,626,096 | 12/1971 | Von Muench | 179/111 R |
| 3,796,835 | 3/1974 | Closs et al. | 179/15 AL |
| 3,851,302 | 11/1974 | Schmitt | 179/15 AL |

Primary Examiner—Thomas A. Robinson
Attorney, Agent, or Firm—Leslie J. Hart; Irving M. Kriegsman

[57] ABSTRACT

A transducer in a telephone handset converts acoustic signals into a digital pulse code. The transducer receives enable pulses from a concentrator system which services a group of telephones and converts each of these pulses into a group of time separated pulses having equal pulse widths. These pulses are applied to a binary coded variable capacitive coupling device. An acoustic device converts the acoustic signal into a related displacement of an output member which in turn couples to a movable capacitive plate in the capacitive coupling device. The output of the transducer is a binary word related to the value of the acoustic signal, the word being generated with each occurrence of the enable pulse. The concentrator has a clock and a pulse distributor for providing enable pulses at different intervals for each telephone set being services. Circuitry is also provided for putting in separate time frames all pulse code signals for all telephones on a twisted pair of conductors connecting the concentrator and the central office.

8 Claims, 10 Drawing Figures

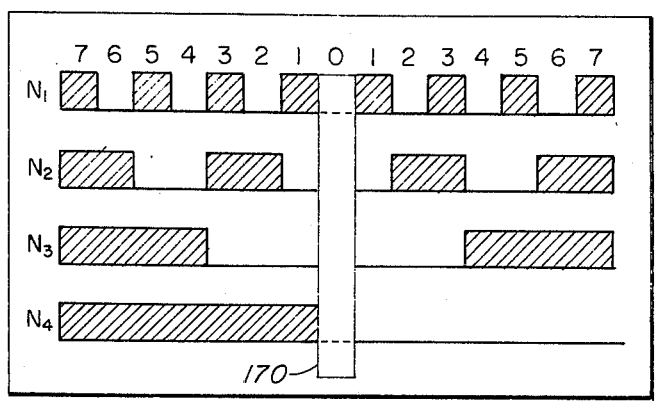
FIG. 4
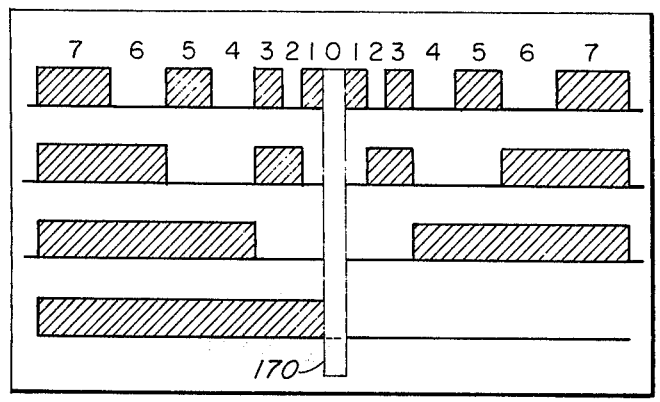
FIG. 6
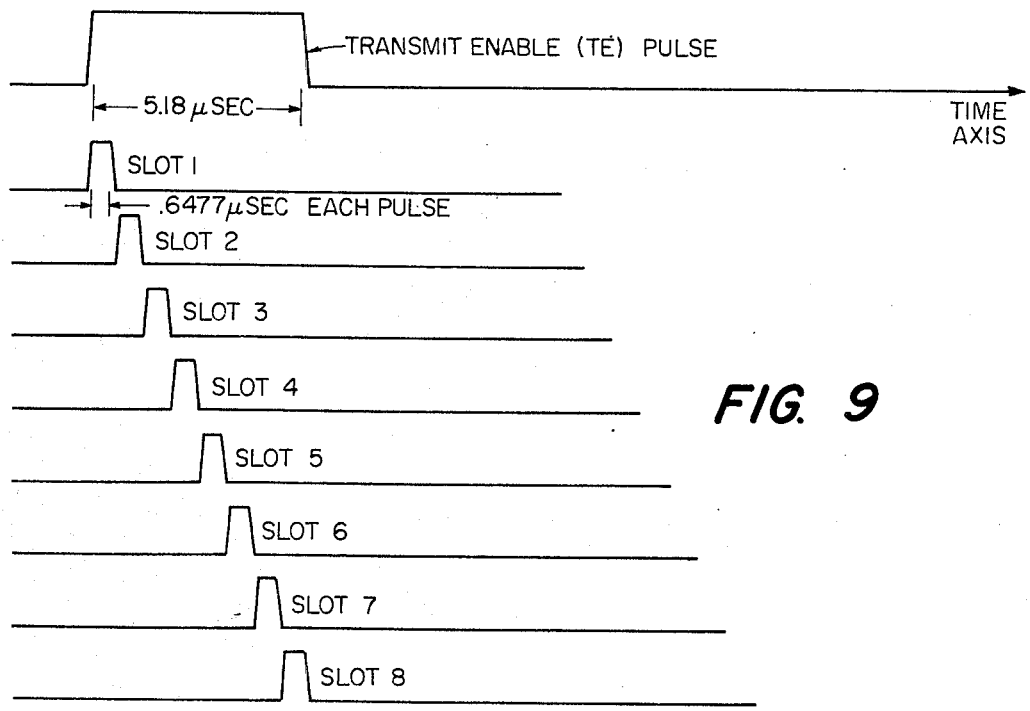
FIG. 5
FIG. 9

ACOUSTIC TO PULSE CODE TRANSDUCER

BACKGROUND OF THE INVENTION

The present invention relates to the art of pulse code modulated telecommunication systems, and, more specifically, to a telecommunication system and to a transducer in which the pulse code modulation is generated at each telephone handset. Pulse code modulation for use in telecommunication systems is not new per se. In a typical system, a central office services a large number of telephone handsets. Each telephone is connected to the office by a pair of insulated wires. The wires connecting each telephone with the central office carry only analog signals. Pulse code modulation and demodulation occurs at a central office and is used in time division multiplex interoffice trunking schemes. The central office includes switching circuitry and digital to analog and analog to digital converters as part of the pcm-tdm interoffice trunking circuitry. These converters are fairly sophisticated circuits. The advantage of this system is the ability of transmitting several signals from one central office to another over a single pair of wires. However, this system, as well as the non-pulse code modulated system, makes inefficient use of the cable connecting the telephones with the central office.

SUMMARY OF THE INVENTION

It is an object of the present invention to provide a new acoustic to pulse code transducer.

It is another object to provide a transducer for a telephone handset so that a digital pulse code is transmitted from the handset rather than an analog voice signal.

It is another object to provide a telecommunication system which transmits signals totally in a digital pulse code format.

According to the present invention, there is provided an apparatus for converting an acoustic signal into a series of digital words, each having N bits and being related to the instantaneous value of the signal. The apparatus has an acoustic device which converts the acoustic signal into a displacement of one output member. A pulse source provides pulses of period T which are applied to a device which generates N time separated output pulses for each pulse received, each output pulse having a width of T/N. A linearly coded variable capacitive coupling device responsive to the output pulses and the acoustic device produces an N bit digital word related to the value of the acoustic signal. The transducer may be implemented using LSI/MOS circuitry and other thin film techniques so that the transducer is capable of being located within a conventionally-sized telephone handset.

An improved telecommunication system is provided in which the telephone utilizes the transducer, and a concentrator is provided between many telephones and a central office. The concentrator provides synchronized pulses for operating the transducer in each telephone handset. This system reduces the amount of cable required because all pulse code signals from all telephones served by the concentrator may be transmitted from the concentrator to the central office on a time shared basis over a single cable system, such as a pair of twisted conductors.

BRIEF DESCRIPTION OF THE DRAWINGS

In the Drawings:

FIG. 4 is a detailed plan view of the capacitive plate of the transducer in FIG. 2;

FIG. 5 is a table which illustrates, in conjunction with FIG. 4, the coding of pulses by the transducer;

FIG. 6 illustrates a capacitive plate structure for compression of the digital speech signals;

FIG. 9 illustrates the waveforms which are generated within the telephone transducer.

DESCRIPTION OF THE PREFERRED EMBODIMENTS

Figure 1:
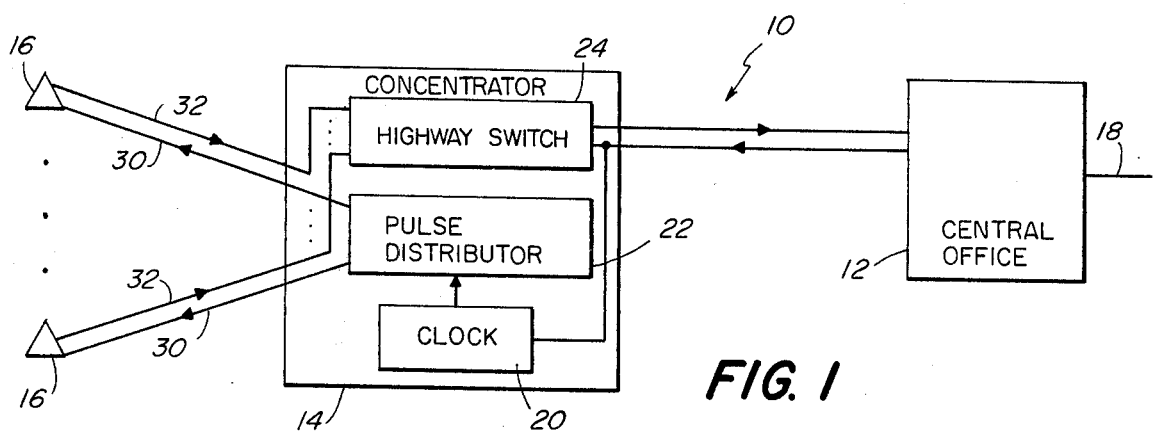
FIG. 1 illustrates a block diagram of a portion of a telecommunication system according to the present invention.
Figure 2:
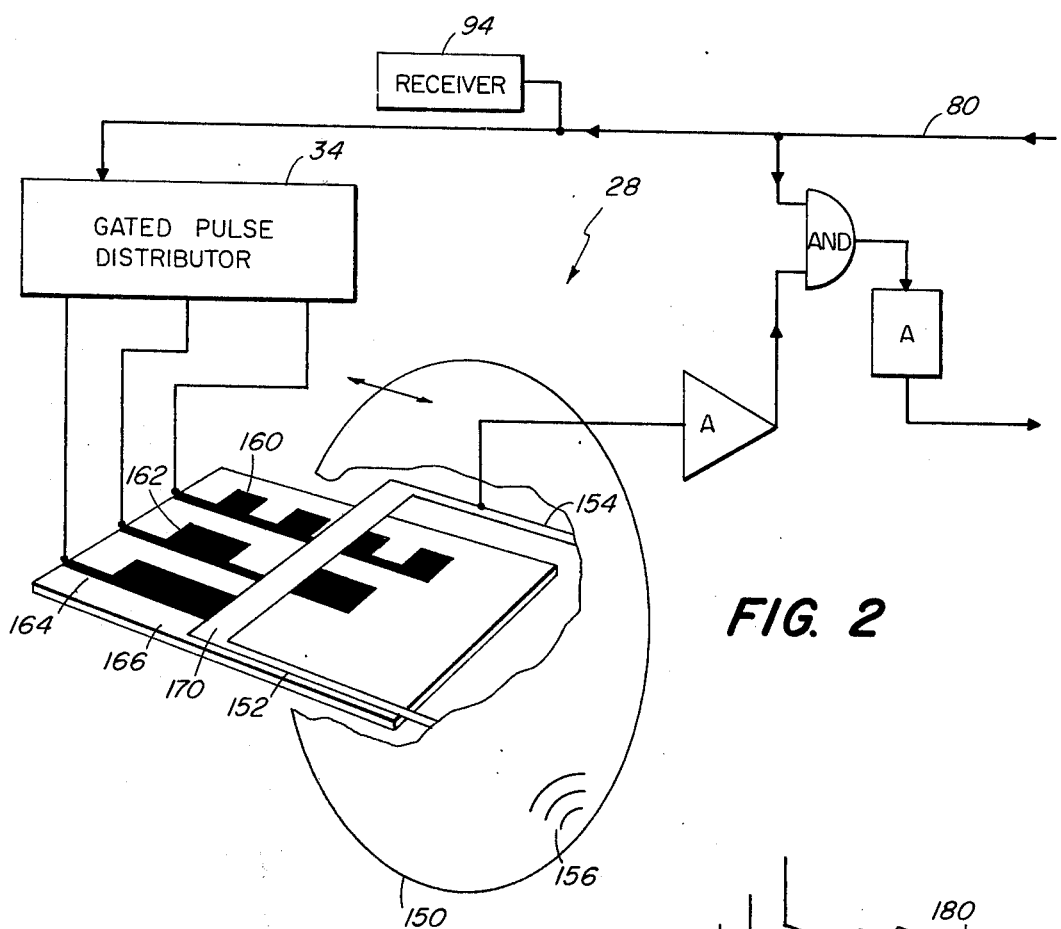
FIG. 2 is a block diagram of a transducer in accordance with the present invention.

In an exemplary embodiment of the present invention, as illustrated in FIG. 1, a telecommunication system 10 is illustrated partially as including a central office 12, a concentrator 14 and a plurality of telephones 16. Typically, each concentrator services 24 telephones, only two of which are illustrated in FIG. 1. The central office includes switching equipment for routing telephonic signals over an appropriate cable 18 which may extend either to another central office (not shown) or to other concentrators (not shown). The concentrator includes a clock 20, a pulse distributor 22 and a highway switch 24. The clock 20 provides appropriate output pulses for the pulse distributor 22 and the highway switch 24. Each of the telephones 16 includes an amplitude to pulse code transducer 28, such as shown in FIG. 2. The pulse distributor sends a transducer enabling pulse signal 30 to each of the telephones 16. The enable pulses 30 to each telephone have the same frequency, but the time interval for the enable pulse to each telephone differs from those going to other telephones. The enable pulse 30 to each telephone is used to generate a pulse code in the transducer 28. The code is transmitted over the conductors 32 to the switch 24 in the concentrator. The switch 24 compensates for the various delays in the receipt of the codes from each telephone due to variations in cable length and transmits all codes over a single cable to the central office.

Figure 7:
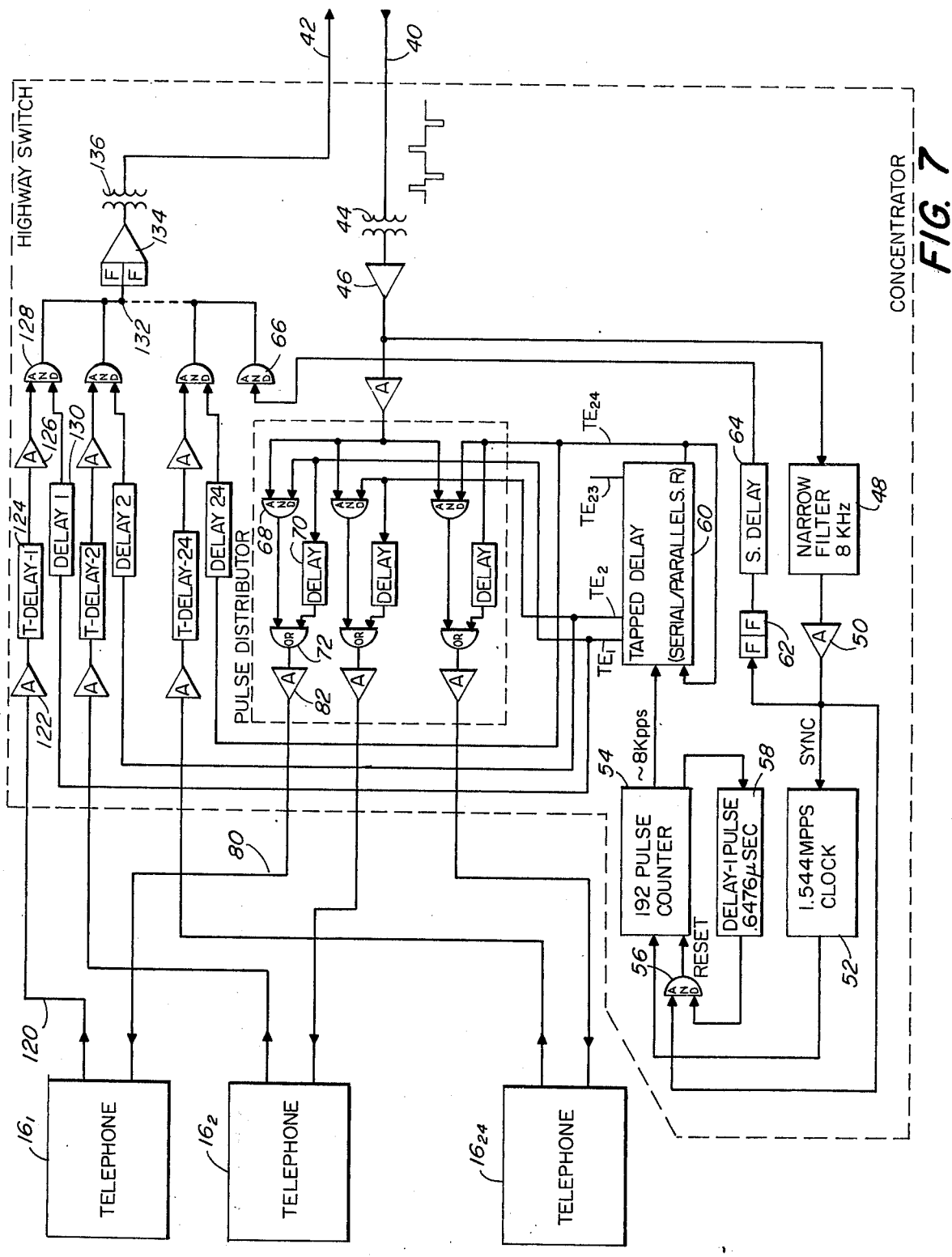
FIG. 7 is a detailed diagram of the concentrator shown in block diagram form in FIG. 1.

The details of the concentrator 14 in FIG. 1 are illustrated in FIG. 7. The concentrator 14 serves 24 telephones and is connected to the central office by a receiver pair 40 of twisted conductors and by a transmit pair 42 of twisted conductors. The receiver pair 40 couples a time division multiplexed group of 24 time slots, each of which is dedicated to a particular one of the 24 telephones $16_1$ through $16_{24}$. The time slots contain pulses which are eventually directed to the receiver portion (not shown) of the respective telephones. The pulse code in each time slot is converted to an acoustic signal by a transducer located in the telephone handset, such as by the transducer described in my pending patent application, Ser. No. 527,668. A pulse train is also transmitted over the receive pair to synchronize the concentrator timing system to the central office timing system; preferably, this pulse train has a frequency of 8 kHz. The input pulses to the concentrator 14 are coupled through a transformer 44 and a rectifying amplifier 46 which amplifies and converts the bipolar pulses to single polarity pulses. In a typical pulse train, a first logic "1" would be +3 volts, a logic "0," 0 volts, and a succeeding logic 1, −3 volts. The rectifying amplifier 46 converts all logic 1's to the same voltage level. All pulses are then applied to a narrow 8 kHz filter 48 whose output is only the 8 kHz sine wave signal which is applied to an amplifier 50, which is overdriven, thereby creating a square wave. The 8 kHz signal synchronizes a clock 52 which preferably provides an output pulse train having a frequency of 1.544 MPPS. The output of the clock 52 is directed to a 192 pulse counter 54 whose output is an 8 kHz pulse train having a pulse duration of 5.18 $\mu$ seconds. The counter 54 is reset when the inputs to an AND gate 56 are both logic 1, the inputs being the 8 kHz output from the amplifier 50 and the output of a 0.6476 $\mu$ second delay 58 whose input is the 8 KPPS signal from the counter 54.

The 5.18 $\mu$ second, 8 kHz pulse signal from the counter 54 is applied to a tapped delay line, serial to parallel converter 60 whose output includes 24, 8 kHz signals, each being of 5.18 $\mu$ seconds duration but occurring within distinct intervals of the 125 $\mu$ second period of the 8 kHz pulse. These signals are the transmit enable pulse ($TE_1$, $TE_2$, etc.) for each of the 24 telephone handsets. The output of amplifier 50 is also directed to the series combination of a flip flop 62, a delay device 64 and an AND gate 66; these elements put an 8 kHz sync pulse on the transit pair 42 so that the central office is able to identify the pulses which were generated by each telephone handset.

The TE pulses are now described with reference only to $TE_1$, the other 23 being treated identically except as mentioned hereinafter. The signal $TE_1$ and the input to the concentrator from the receiver pair 40 are directed to an AND gate 68 whose output thus becomes the digital pulse code for the receiver of the telephone $16_1$. The signal $TE_1$, is also delayed about 62.5 $\mu$ seconds by a delay device 70, and after being so delayed, $TE_1$ is combined with the pulses in the receive time slot at an OR gate 72. The input to the telephone $16_1$ is transmitted over a twisted pair of conductors 80 after the input is directed through an amplifier 82.

Figure 8:
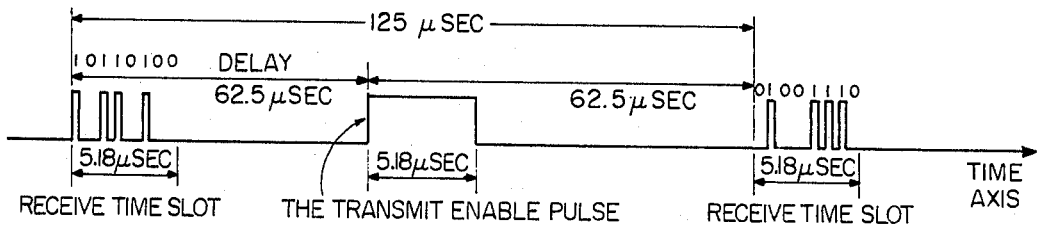
FIG. 8 is a waveform of the input to the telephone from the concentrator.
Figure 10:
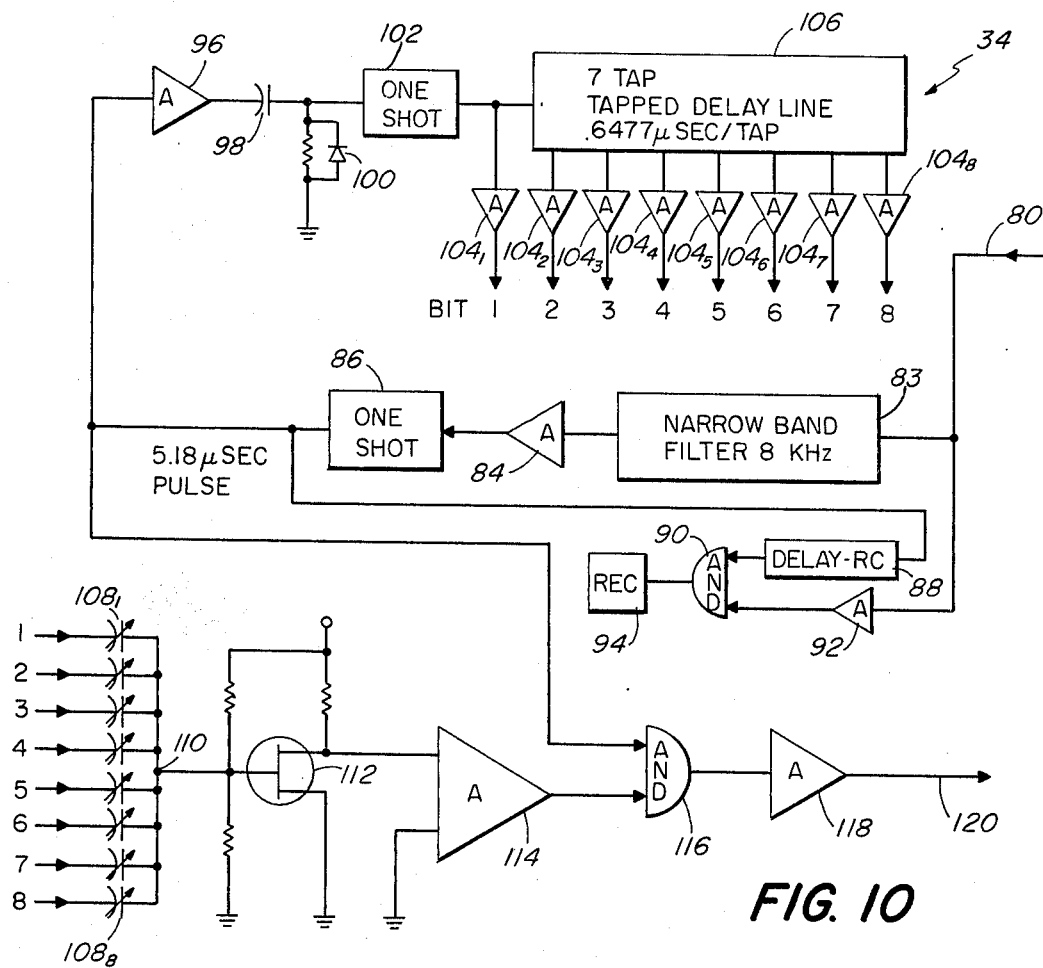
FIG. 10 is a detailed diagram of the electronic components in the telephone transducer.

FIG. 8 illustrates the signals which are transmitted over the twisted pair 80 and their phase relationship. Referring now to FIG. 10, the signal is transmitted over the twisted pair 80 to the hereinafter described electronics within the telephone $16_1$. First, the $TE_1$ signal must be separated from the pulses in the receive time slot because $TE_1$ is directed to the transmitter of the telephone, while the pulse code is directed to the receiver of the telephone. A narrow band 8 kHz filter 83 filters the pulses and permits only the $TE_1$ signal to be directed to the amplifier 84 and the one shot multivibrator 86. The output of the one shot 86 is directed to a delay element 88 whose output is applied to an AND gate 90; the signal on the twisted pair 80 is passed through an amplifier 92 and applied to another input of the AND gate 90. The delay 88 is adjusted to provide a delay of 62.5 $\mu$ seconds so that the delayed output coincides with the next receive time slot. Thus, the input to a receiver 94 is the digital pulse code. The receiver 94 includes an appropriate transducer, not forming a part of the present invention, to convert the pulse code to an acoustic signal.

The output of the one shot 86 is directed to an amplifier 96 whose output is first differentiated at 98 to create a positive spike as the $TE_1$ signal goes to its more positive level and a negative spike when $TE_1$ goes negative. A diode 100 removes the negative spike from the output of the differentiator 98 which is applied to a one shot multivibrator 102. The output of the one shot 102 is an 8 kHz pulse train having pulses of duration 0.6477 $\mu$ second. The output is directed to an amplifier $104_1$, whose output is 1 time slot of an 8 bit time slot for transmission of a digital pulse code, and to a seven tap, tapped delay line device 106. The output signal of each tap is delayed 0.6477 $\mu$ second from that in a preceding tap. Thus, the outputs of amplifiers $104_1$ through $104_8$ are 8 kHz signals having a 0.6477 $\mu$ second duration and occurring during separate intervals of the duration of the transmit enable signal. FIG. 9 illustrates these signals.

The outputs of the amplifiers 104 are directed to a plurality of variable capacitors $108_1$ through $108_8$ whose other terminals form a common junction 110. These capacitors form a part of a binary coded variable capacitive coupling device which will be described in more detail subsequently. Those of the eight pulses which are coupled through their respective capacitors to the junction 110 are directed to an FET and bias network 112, whose output is in turn directed to amplifier 114. The output of amplifier 114 and the transmit enable signal are applied to an AND gate 116 whose output is amplified at 118. The output of amplifier 118 is transmitted over a twisted pair of conductors 120 to the concentrator 14 in FIG. 7. The signal on the twisted pair 120 is an 8 bit digital pulse code at an 8 kHz rate.

Referring again now to FIG. 7, the signal on the twisted pair 120 is applied to an amplifier 122 whose output is directed to a delay element 124. After being amplified at 126, the output of the delay 124 is applied to an AND gate 128. The delay 124 compensates for the time delay in the $TE_1$ signal sent to the telephone as it traverses the twisted pair 80 and in the digital pulse code as it traverses the twisted pair 120. Typically, the distance between the telephone $16_1$ and the concentrator 14 is 1000 or less feet. Assuming that the twisted pair has a 1 to $1.5 \times 10^{-9}$ second delay per foot, the transmitted pulse code at amplifier 122 may be delayed from 2 to 3 $\mu$ seconds from $TE_1$ at the concentrator. To match the word timewise with $TE_1$ requires a delay of slightly less than 125 $\mu$ seconds, the time at which the next $TE_1$ pulse occurs. The purpose of the delay 130 is to adjust the precise time that the digital pulse code from each telephone handset is placed on the twisted pair 42. The delay 124 delays the pulse code slightly less than 125 $\mu$ seconds so that the code coincides timewise with the adjusted $TE_1$ signal. The gated output of the AND gate 128 is combined with pulse codes of the other telephones and the framing pulse at a junction 132. The combined signals at the junction 132 are directed to a bipolar pulse train generator 134 whose output is directed via a transformer 136 to the transit twisted pair 42. The only difference structurally between the pulse distributor and highway switch for the telephone $16_1$ and the other 24 telephones is the time delay adjustments to compensate for the particular distance separating each telephone from the concentrator.

One feature of the present invention is the transducer for converting the acoustic signal into a digital pulse code. FIG. 2 illustrates some of the details of this transducer for the generation of a 3 bit code. The transducer 28 includes an acoustic device, such as a diaphragm 150, which receives the acoustic signal and has an output member, such as arms 152 and 154, whose position is related to the instantaneous value of the acoustic signal. Acoustic pressure, illustrated at 156, deflects the diaphragm and the arms 152 and 154 which are connected to the diaphragm. The transducer requires a source of pulses having a width T. Preferably, these pulses are the transmit enable pulses which are generated in the concentrator and supplied to the transducer via the twisted pair of cables 80 in FIG. 2. For an 8 bit code, the preferred width T of the pulses is 5.18 $\mu$ seconds as illustrated in FIG. 9. A gated pulse distributor 34 receives these pulses and generates N time separated output pulses, each pulse having a width of T/N seconds. Such a distributor has previously been described with reference to FIG. 10 and includes the tapped delay line 106 and the amplifiers 104. The distributor 34 is readily implemented with LSI/MOS circuitry. As illustrated in FIG. 9 the width of these pulses, T/N, is 0.6477 $\mu$ second for an 8 bit code in which the width of the enable pulse is 5.18 $\mu$ seconds. The transducer has a binary coded variable capacitive coupling device which responds to the output pulses and the diaphragm position to produce an N bit digital pulse code at each occurrence of the enable pulse. In FIG. 2, the coupling device includes three binary conductive patterns 160, 162 and 164 which are deposited on a fixed, non-conductive substrate 166. The arms 152 and 154 are connected to a movable conductive plate 170 which is in charge coupling relation to the binary patterns. In operation, the charge or pulse level on any binary pattern is coupled to the plate 170 when the plate 170 is directly over the portion of the pattern having a large conductive area.

FIG. 4 and FIG. 5 illustrate this idea in more detail and also show how the coupling device may be implemented to show polarity as well as magnitude. In FIG. 4 three magnitude bits and one polarity bit are generated. The binary pattern has a null position in which the movable plate 170 is located where there is no acoustic signal; this is position 0 in FIG. 4. The binary pattern $N_P$ indicates polarity by causing the generation of a logic 0 or 1 depending on whether the plate 170 moves to the right or to the left, respectively, from position 0. The placement and shape of binary patterns $N_1$, $N_2$ and $N_3$ are such that binary coded signals are discretely generated for each of the positions 1 through 7 which the plate 170 could occupy. Preferably, the width of plate 170 is the same as the width of the 1 or 0 state of the most frequently changing binary pattern which is $N_1$.

FIG. 6 illustrates a binary pattern for providing compression, a necessary technique in companding pulse code modulated speech. Another technique is to use a non-linear spring which is attached to the movable conductor plate 170 and to use the binary pattern of FIG. 4 rather than that in FIG. 6.

Figure 3:
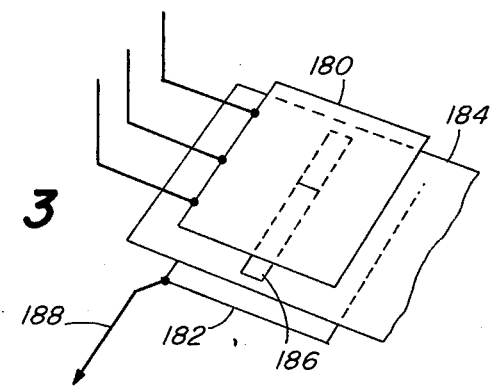
FIG. 3 is an alternative embodiment of the transducer according to the present invention.

FIG. 3 illustrates an alternative embodiment for the capacitive coupling device of FIG. 2. This device includes a pair of matched binary patterns on a pair of fixed non-conductive substrates 180 and 182. These patterns are in charge coupling relation to each other.

A movable metal shield 184 is connected to the diaphragm. Depending on the position of the shield 184, certain charges or pulses on the patterns on the substrate 180 are coupled through the aperture 186 to patterns on the substrate 182. These patterns are electrically common to output lead 188.

For a system which encodes to 128 levels of either polarity, the resulting 256 levels would require an 8 bit sample, hence a gated pulse distributor having 8 output lines would be required. Assuming that the least significant bit in the binary pattern has dimensions of $5 \times 10^{-4}$ cm ($5\mu$), the excursion between full deflection is $256 \times 5 \times 10^{-4}$ cm or 1.28 mm. The movable capacitor plate is a metal film $5 \times 10^{-4}$ cm wide, and $50 \times 10^{-4}$ cm long. Fixed capacitor plates for the finest pattern would be $5 \times 10^{-4}$ cm wide separated by $1.25 \times 10^{-4}$ cm spacing. For the next finest pattern, the plates would be $10 \times 10^{-4}$ cm wide. The value of the coupling capacitors is approximately 5 pf.

The embodiments of the present invention are merely exemplary and those skilled in the art will be able to make numerous variations and modifications of them without departing from the spirit of the present invention. All such variations and modifications are intended to be included within the scope of the present invention as defined in the following claims.

I claim:

1. Apparatus for converting an analog acoustic signal into a series of digital words, each having N bits and being related to the instantaneous absolute value of the acoustic signal, including;
    a. an acoustic device receiving the acoustic signal and having an output member whose position is related to the instantaneous value of the acoustic signal,
    b. a source of pulses, each pulse having a width T,
    c. a gated pulse distributor means responsive to the pulses from the pulse source for generating N time separated output pulses for each pulse, each output pulse having a width of T/N where N is an integer greater than one, the output pulses corresponding to a particular pulse from the source occurring during the time interval of the pulse, and
    d. binary coded variable capacitive coupling means responsive to the output pulses and the position of the output member for providing a serial N bit digital word which is related to the position of the output member and thus to the absolute value of the acoustic signal at each occurence of the pulse, the movable member controlling the surface area of at least one of a pair of opposed conductive plates forming the coupling means.

2. The apparatus according to claim 1, wherein the coupling means includes:
    a. fixed binary coded capacitive plate structure having N conductive plates, each of which is connected to one of the N output pulses, and
    b. a movable conductive plate in charge coupling relation to all of the N conductive plates of the fixed structure and connected to the output member so that the movable plate moves longitudinally to all N conductive plates in response to the acoustic device.

3. The apparatus according to claim 1, wherein the coupling means includes:
    a. a pair of fixed binary coded capacitive plate structures each having N conductive plates, each of the plates of one plate structure being connected to one of the N output pulses, the pair being in charge coupling relation to each other, and b. a movable shield disposed between the plate structures, the shield being formed with an aperture and connected to the output member.

4. The apparatus according to claim 1 further including means for compressing the digital words to improve the signal-to-noise ratio.

5. The apparatus according to claim 1, wherein N is equal to 8.

6. The apparatus according to claim 1, wherein the coupling means includes polarity sensing means to determine the direction of movement of the output members with respect to a null position.

7. The apparatus according to claim 5, wherein the pulses from the source have a constant frequency of about 192 kHz.

8. The apparatus according to claim 7, wherein the width of each pulse is about 5 $\mu$ seconds and the width of each output pulse is about 0.65 $\mu$ second.

* * * * *